(12) United States Patent
Ishikawa (10) Patent No.: US 12,253,170 B2
(45) Date of Patent: Mar. 18, 2025

(54) TENSIONER

(71) Applicant: TSUBAKIMOTO CHAIN CO., Osaka (JP)

(72) Inventor: Yuichiro Ishikawa, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 0 days.

(21) Appl. No.: 18/379,910

(22) Filed: Oct. 13, 2023

(65) Prior Publication Data

US 2024/0133450 A1  Apr. 25, 2024
US 2024/0229902 A9  Jul. 11, 2024

(30) Foreign Application Priority Data

Oct. 20, 2022 (JP) .................................. 2022-168387

(51) Int. Cl.
*F16H 7/08* (2006.01)

(52) U.S. Cl.
CPC ....... *F16H 7/08* (2013.01); *F16H 2007/0806* (2013.01); *F16H 2007/0812* (2013.01); *F16H 2007/0872* (2013.01); *F16H 2007/0893* (2013.01); *F16H 2007/0897* (2013.01)

(58) Field of Classification Search
CPC ........................... F16H 7/08; F16H 2007/0806
USPC ....................................................... 474/110
See application file for complete search history.

(56) References Cited

U.S. PATENT DOCUMENTS

| | | | |
|---|---|---|---|
| 7,404,776 B2 * | 7/2008 | Yoshida ................ | F16H 7/0836 474/110 |
| 11,125,304 B2 * | 9/2021 | Watanabe ................. | F16H 7/08 |
| 11,448,292 B2 * | 9/2022 | Ishikawa ................... | F16H 7/08 |
| 2017/0146099 A1 * | 5/2017 | Watanabe ................. | F16H 7/08 |
| 2017/0211663 A1 * | 7/2017 | Furukawa ............. | F16H 7/0848 |
| 2019/0128389 A1 * | 5/2019 | Ullein ................... | F16H 7/0834 |
| 2019/0257389 A1 * | 8/2019 | Sato .......................... | F16H 7/08 |
| 2019/0277370 A1 * | 9/2019 | Iwasaki ..................... | F16H 7/08 |
| 2019/0323580 A1 * | 10/2019 | Watanabe ............. | F16H 7/0848 |
| 2020/0393023 A1 * | 12/2020 | Ishikawa ................... | F16H 7/08 |
| 2024/0011572 A1 * | 1/2024 | Ishikawa ............... | F16K 15/044 |

FOREIGN PATENT DOCUMENTS

JP           6982243 B2    12/2021

* cited by examiner

*Primary Examiner* — Michael R Mansen
*Assistant Examiner* — Mark K Buse
(74) *Attorney, Agent, or Firm* — WHDA, LLP (57) ABSTRACT

An object of the present invention is to provide a tensioner with a simple structure that effectively maintains the oil pressure inside an oil pressure chamber at a correct level, while also making the machining and assembling processes less demanding. The tensioner includes a relief mechanism, which includes an orifice member that has an oil passage designed to form an orifice structure. The orifice member has a flat circular end wall part and a circumferential wall part that extends rearwards from the peripheral edge of the end wall part. The circumferential wall part includes a bulged portion that extends rearwards and is curved radially outwards. The bulged portion is designed such that the diameter of the circumscribed circle of the orifice member is greater than the inside diameter of the plunger as viewed in plan from an axial direction before the orifice member is press-fit into the plunger.

4 Claims, 7 Drawing Sheets

Related Art

TENSIONER

BACKGROUND OF THE INVENTION

1. Field of the Invention

The present invention relates to a tensioner that applies correct tension to a running chain or belt.

2. Description of the Related Art

Tensioners have been commonly used to keep correct tension in a chain or the like. For example, in a chain guide mechanism with a tensioner lever that slidably guides a drive chain such as an endless roller chain passing over respective sprockets of a crankshaft and camshafts inside an engine room, a tensioner is used to bias the tensioner lever to keep correct tension in the chain or the like.

Figure 12:
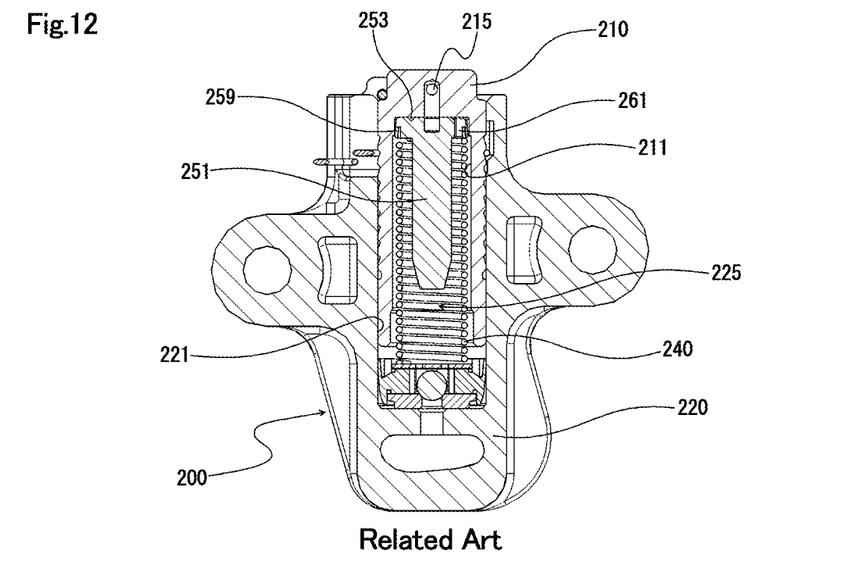
FIG. 12 is a cross-sectional view along the center axis of the plunger illustrating one configuration example of a conventional tensioner.

FIG. 12 shows an example of one known tensioner used in such a chain guide mechanism. The tensioner 200 has a plunger 210, with a plunger hole 211 open towards the rear side, and an outlet relief hole 215 opened in the top end on the front side of the plunger hole 211 for communication with an outside space. A housing 220 has a plunger bore 221 open towards the front side for accommodating the plunger 210. A main biasing means 240 is housed in the oil pressure chamber 225 that is formed between the plunger hole 211 and the plunger bore 221 such as to freely expand and contract for biasing the plunger 210 towards the front side. An orifice member 251 has one side in contact with the top end on the front side of the plunger hole 211 and the other side facing the oil pressure chamber 225. The orifice member 251 has an orifice groove 253 provided on the surface on the one side, and a communication part 261 that extends through to communicate the one side and the other side (see, for example, Japanese Patent No. 6982243).

In the tensioner 200 described in Japanese Patent No. 6982243, the orifice member 251 is press-fit into the plunger hole 211, and secured in contact with the top end on the front side of the plunger hole 211. An oil passage that forms an orifice structure is configured by the press-fit orifice member to communicate the oil pressure chamber 225 with the outside space. The tensioner is designed to release the oil inside the oil pressure chamber 225 out of the plunger 210 when the oil pressure inside the oil pressure chamber 225 rises.

SUMMARY OF THE INVENTION

In the tensioner 200 described in Japanese Patent No. 6982243, the orifice member 251 has a deformable interference fit part 259. When the orifice member 251 is press-fit into the plunger 210, the deformable interference fit part 259 undergoes deformation, enabling a fit between the orifice member 251 and the inner circumferential surface of the plunger hole 211.

However, this design of the tensioner 200 described above is inherently susceptible to stress concentration and significant deformation, primarily due to the shape of the deformable interference fit part 259. This results in inconsistent application of force relative to the amount of interference. Accordingly, there is a risk of the orifice member 251 detaching during the assembly of the tensioner or the deformable interference fit part 259 breaking during the press-fit process of the orifice member 251.

To prevent such incidents, it is necessary to tightly control the amount of interference by enhancing the machining precision of the outside diameter of the orifice member 251 and the inside diameter of the plunger hole 211. However, this would result in more demanding machining and assembling processes.

The present invention addresses these issues and aims to provide a tensioner with a simple structure that effectively maintains the oil pressure inside the oil pressure chamber at a correct level, while also making the machining and assembling processes less demanding.

The present invention achieves the above object by providing a tensioner including: a plunger having a plunger hole open towards a rear side, and an outlet relief hole opened in a top end on a front side of the plunger hole for communication with an outside space; a housing having a plunger bore open toward a front side for accommodating the plunger in a slidable manner; a main biasing means housed in an oil pressure chamber that is formed between the plunger and the plunger bore such as to freely expand and contract and biasing the plunger towards the front side; and a relief mechanism that releases oil inside the oil pressure chamber out of the plunger when oil pressure inside the oil pressure chamber rises. The relief mechanism includes an orifice member having an oil passage configured to form an orifice structure for communication between the oil pressure chamber and the outlet relief hole. The orifice member is cup-shaped and configured to allow press-fit into the plunger hole, having a flat circular end wall part and a circumferential wall part that extends rearwards from a peripheral edge of the end wall part. The circumferential wall part includes a bulged portion that extends rearwards and is curved radially outwards. The bulged portion is designed such that the orifice member has a circumscribed circle with a diameter that is greater than an inside diameter of the plunger as viewed in plan from an axial direction before the orifice member is press-fit into the plunger.

According to the invention set forth in claim 1, the simple structure in which the orifice member is disposed inside the plunger effectively maintains the pressure inside the oil pressure chamber at the right level.

The cup-shape design of the orifice member with an annular and circumferentially continuous circumferential wall part allows the orifice member to exhibit high rigidity, so that the orifice member allows exertion of sufficient force during the press-fit process into the plunger hole. Due to the annular and continuous nature of the circumferential wall part, the bulged portion undergoes radial deformation and reduces in diameter as the orifice member is press-fit into the plunger, while other parts than the bulged portion deform and radially expand. This design allows a relatively large amount of interference to be tolerated, and minimizes variations in the force exerted during the press-fit process that result from the varying amount of interference, leading to more consistent force exertion. Therefore, the orifice member is unlikely to experience stress concentration or undergo significant deformation during the press-fit process. The occurrence of burrs or breakage of the orifice member can be prevented, and the risk of detachment of the orifice member after press-fit is eliminated, which makes the assembly process less demanding.

Furthermore, the increased tolerance range of the amount of interference not only allows for higher flexibility in assembling and designing processes of the tensioner but also eliminates the need for machining the plunger to a specific inside diameter. This reduces the demands placed on the machining process and enables cost-effective production.

According to the invention set forth in claim 2, at least three circumferentially spaced bulged portions make pressure contact with an inner circumferential surface of the plunger to position the orifice member. Therefore, the orifice member can be securely positioned in the correct orientation.

According to the invention set forth in claim 3, there is increased flexibility in designing the oil passage that forms the orifice structure. This helps prevent variations in the oil flow rate resulting from differences in the length of the orifice structure, which ensures that the oil pressure inside the oil pressure chamber is maintained at the right level.

According to the invention set forth in claim 4, the force that maintains the press-fit of the orifice member is resistant to decrease or deterioration over time, ensuring reliable prevention of detachment of the orifice member. The orifice member can be produced solely through press-forming, for example, enabling cost-effective mass-production.

Moreover, the plastic deformation of the metal can be utilized to achieve a tight contact between the top end on the front side of the plunger hole and the front surface of the end wall part of the orifice member, creating a seal between them. This feature allows for cost reduction as a seal can be formed even when the top end of the plunger hole has low precision finishing.

DESCRIPTION OF THE PREFERRED EMBODIMENTS

A tensioner according to the present invention will be hereinafter described with reference to the drawings.

Figure 1:
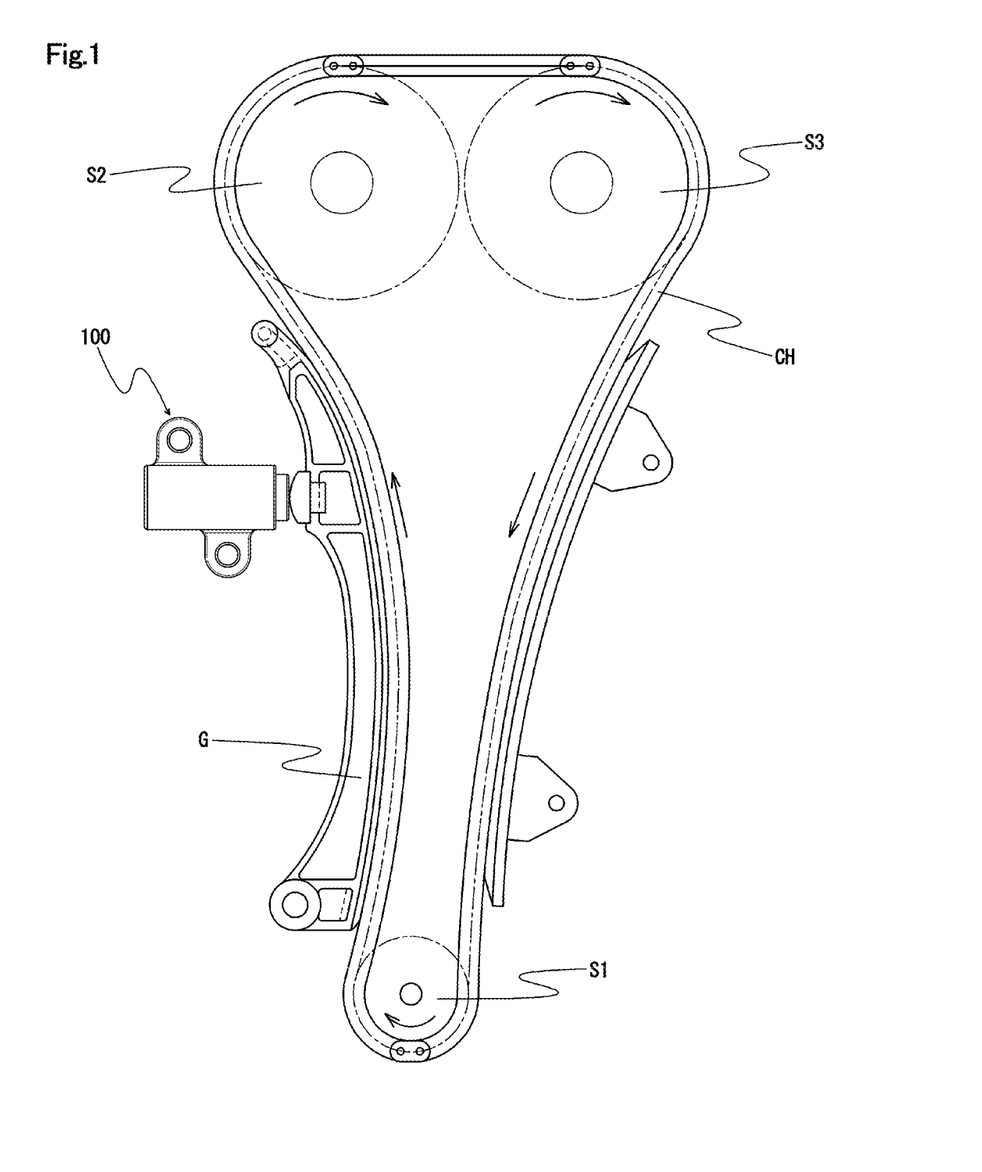
FIG. 1 is an illustrative diagram showing one example of a timing system in which a tensioner according to the present invention is incorporated.

The tensioner according to the present invention is incorporated in a chain drive device used in a timing system or the like of a car engine. Specifically, as shown in FIG. 1, the tensioner 100 is mounted to an engine block (not shown) on the slack side of a drive chain CH passed over a plurality of sprockets S1 to S3 to apply correct tension via a tensioner lever G.

Figure 2:
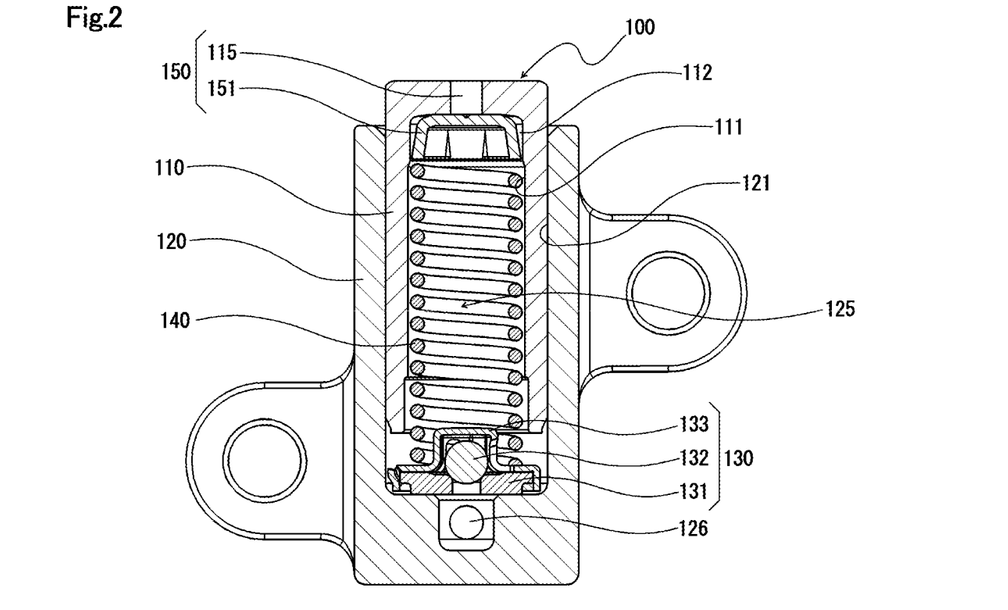
FIG. 2 is a cross-sectional view along the center axis of the plunger in one configuration example of the tensioner according to the present invention.

As shown in FIG. 2, the tensioner 100 includes a plunger 110, a housing 120, a main biasing means 140, and a relief mechanism 150.

The plunger 110 is cylindrical, with a plunger hole 111 open towards the rear side, and an outlet relief hole 115 that is opened in the top end on the front side of the plunger hole 111 for communication with an outside space.

In this embodiment, the plunger hole 111 is made up of three continuous columnar spaces decreasing in the inside diameter stepwise towards the front side. The space at the front having the smallest inside diameter is the orifice member accommodating space 112.

The outlet relief hole 115 is formed to extend linearly in the axial direction, for example along the center axis of the plunger 110.

The housing 120 has a plunger bore 121 open towards the front side for accommodating the plunger 110 in a slidable manner. The plunger 110 is inserted in the plunger bore 121 with its open end positioned inside the plunger bore 121. An oil pressure chamber 125 is formed between the plunger hole 111 and the plunger bore 121, i.e., by the internal space of the plunger hole 111 and the internal space of the plunger bore 121.

At the bottom of the housing 120 is disposed a check valve 130, which allows the oil to flow in from the outside through an oil supply hole 126 into the oil pressure chamber 125, and prevents the oil from flowing out through the oil supply hole 126.

The check valve 130 is made up of a ball seat 131 arranged in tight contact with the bottom of the plunger bore 121, a spherical check ball 132 that sits on the ball seat 131 and makes tight contact therewith, and a retainer 133 disposed on the front side of the check ball 132 to restrict the movement of the check ball 132.

Optionally, a ball spring that biases the check ball 132 towards the ball seat 131 may be provided between the check ball 132 and the retainer 133.

The main biasing means 140 is housed in the oil pressure chamber 125 such as to freely expand and contract and to bias the plunger 110 towards the front side. In this example, the main biasing means 140 is a coil spring, arranged such that the coil axis extends along the center axis of the plunger 110.

The relief mechanism 150 is provided to release the oil in the oil pressure chamber 125 to the outside of the plunger 110 when the oil pressure in the oil pressure chamber 125 rises. The relief mechanism is made up of the outlet relief hole 115 of the plunger 110, and an orifice member 151 having an oil passage that communicates the oil pressure chamber 125 with the outlet relief hole 115.

Figure 3:
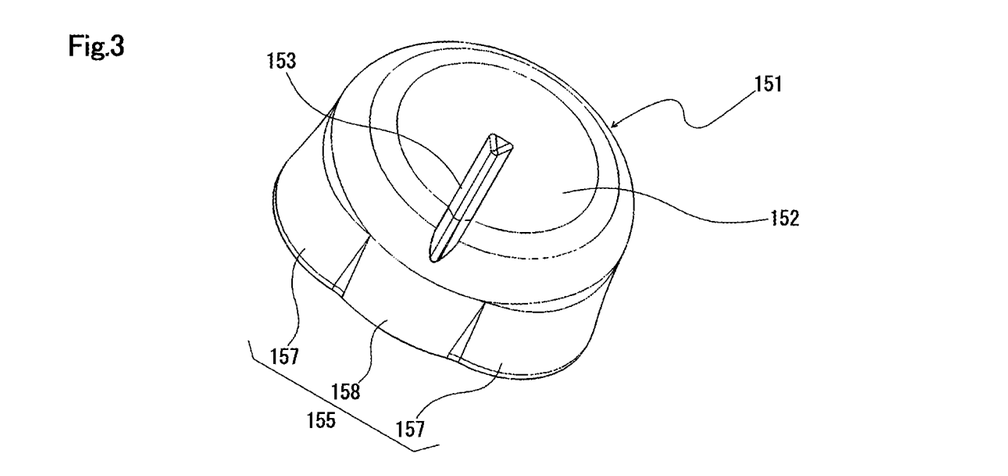
FIG. 3 is a perspective view from the front side illustrating the configuration of an orifice member in the tensioner shown in FIG. 2.
Figure 4:
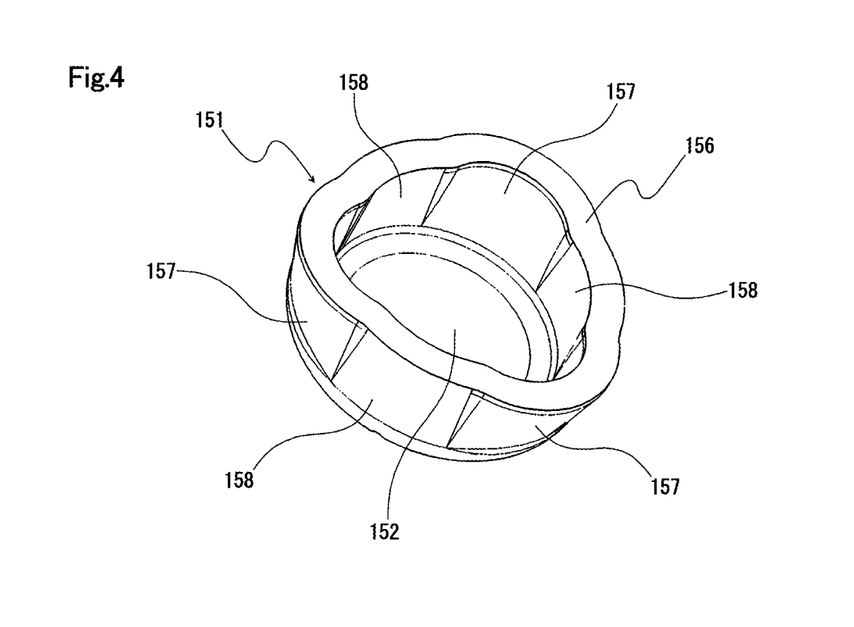
FIG. 4 is a perspective view from the rear side of the orifice member shown in FIG. 3.
Figure 5:
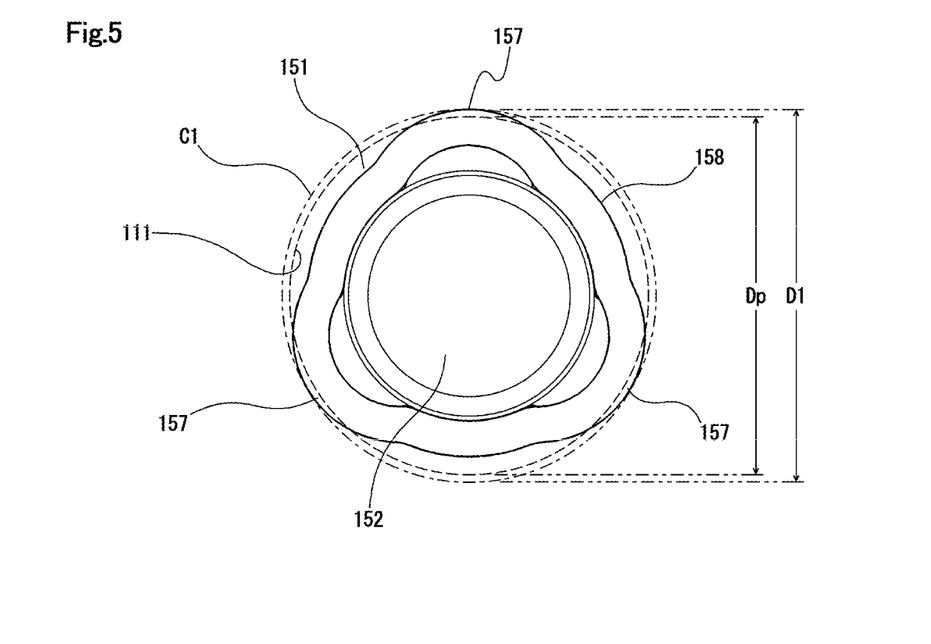
FIG. 5 is a plan view from the rear side of the orifice member shown in FIG. 3.

The orifice member 151 has a cup-like shape, with a flat circular end wall part 152 and a circumferential wall part 155 that extends rearwards from the peripheral edge of the end wall part 152 as shown in FIG. 3 to FIG. 5, to allow for press-fit into the plunger hole 111.

The circumferential wall part 155 is annular and continuous in the circumferential direction, and includes bulged portions 157 that are curved radially outwards so that the cylindrical outline partially increases in diameter from the front towards the rear.

The orifice member 151 exhibits high rigidity due to its annular and continuous circumferential wall part 155, and allows exertion of sufficient force when pressed into the plunger hole 111.

In this embodiment, three bulged portions 157 are circumferentially equally spaced apart. By positioning each of the bulged portions 157 in pressure contact with the inner circumferential surface of the plunger 110, the orifice member 151 can be securely positioned in the correct orientation. As long as there are at least three equally spaced bulged portions 157 along the circumference, the number of the bulged portions 157 is not limited.

The bulged portions 157 are designed such that, as shown in the plan view of FIG. 5, when viewed from an axial direction, the diameter D1 of the circumscribed circle C1 of the orifice member 151 is greater than the inside diameter of the plunger 110, particularly the inside diameter Dp of the orifice member accommodating space 112, prior to the press-fit operation into the plunger 110. The broken line in FIG. 5 indicates the inner peripheral edge of the orifice member accommodating space 112 in the plunger hole 111.

In this tensioner 100, the front surface of the end wall part 152 of the orifice member 151 comes into contact with the top end on the front side of the plunger hole 111, forming a seal for the outlet relief hole 115.

Figure 6:
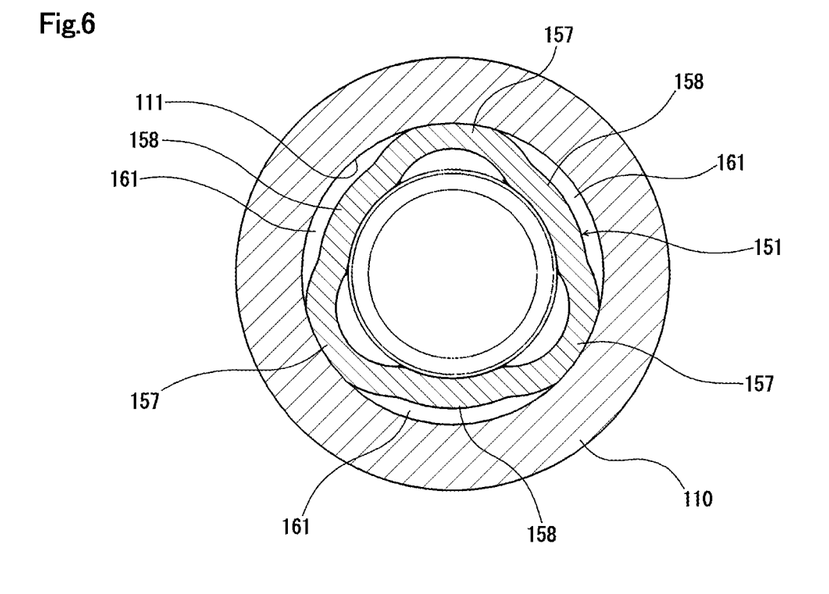
FIG. 6 is a radial cross section of the tensioner shown in FIG. 2 along a plane perpendicular to the center axis of the plunger, viewed from the rear in the axial direction at an axial position where an orifice member accommodating space is formed.
Figure 7:
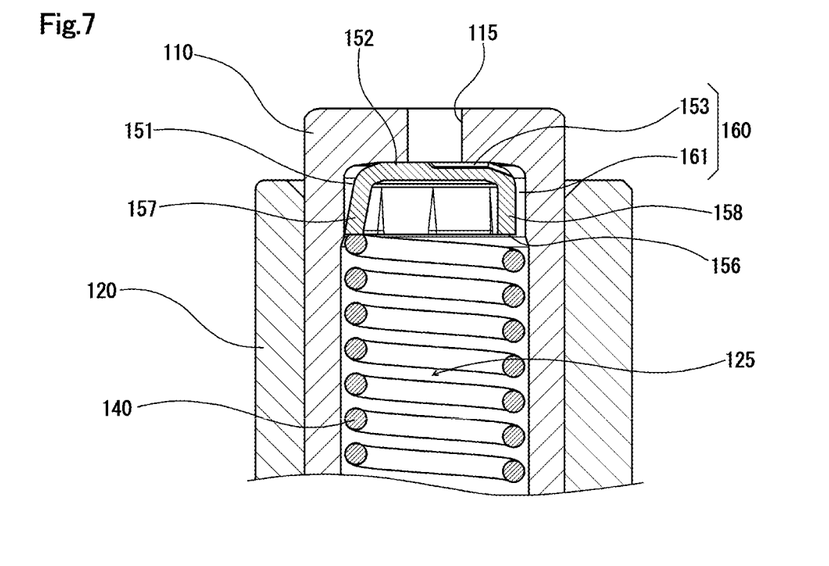
FIG. 7 is a cross-sectional view along the center axis of the plunger in the tensioner shown in FIG. 2, illustrating a part of a cross section different from FIG. 2.

In the front surface of the end wall part 152 of the orifice member 151, there is provided an orifice groove 153 that is in communication with the outlet relief hole 115. Moreover, as shown in FIG. 6, with the orifice member 151 positioned inside the plunger hole 111, there are spaces located between the outer circumferential surface of cylindrical portions 158 in between adjacent bulged portions 157 and the inner circumferential surface of the plunger hole 111. These spaces form a communication part 161 that allows communication between the orifice groove 153 and the oil pressure chamber 125. Thus, an orifice structure is formed by an oil passage 160 that communicates the oil pressure chamber 125 with the outlet relief hole 115, as shown in FIG. 7.

By providing the orifice groove 153 on the front surface of the end wall part 152 of the orifice member 151, there is increased flexibility in designing the oil passage 160 that forms the orifice structure. This helps prevent variations in the oil flow rate resulting from differences in the length of the orifice structure, which ensures that the oil pressure inside the oil pressure chamber 125 is maintained at the right level.

The orifice groove 153 in this embodiment has a V-shaped cross section. The groove extends linearly from the center of the end wall part 152 radially outwards.

The orifice member 151 also serves as a receiver for the main biasing means 140. The orifice member 151 is therefore able to exert a high surface pressure to the top end of the plunger hole 111, reliably preventing formation of a gap between the front surface of the end wall part 152 of the orifice member 151 and the top end of the plunger hole 111.

The main biasing means 140 is in contact with an end face 156 of the circumferential wall part 155 in this embodiment. Instead, the main biasing means 140 can be set in contact with an inner surface of the end wall part 152.

The orifice member 151 is made of a metal material for example. Therefore, the force that maintains the press-fit of the orifice member is resistant to decrease or deterioration over time, ensuring reliable prevention of detachment of the orifice member 151. The orifice member can be produced solely through press-forming, for example, enabling cost-effective mass-production. Moreover, the plastic deformation of the metal can be utilized to achieve a tight contact between the top end on the front side of the plunger hole 111 and the front surface of the end wall part 152 of the orifice member 151, creating a seal between them. This feature allows for cost reduction as a seal can be formed even when the top end of the plunger hole 111 has low precision finishing.

In the tensioner 100 of this embodiment configured as described above, impact or load applied from the drive chain CH on the plunger 110 raises the oil pressure in the oil pressure chamber 125. The oil in the oil pressure chamber 125 then flows into the oil passage 160 that forms the orifice structure, and flows out of the plunger 110 through the outlet relief hole 115. Consequently, the oil pressure inside the oil pressure chamber 125 is maintained at the right level.

Likewise, any trapped air in the oil pressure chamber 125 travels into the oil passage 160 and exits to the outside space via the outlet relief hole 115.

As described above, according to the tensioner 100 of this embodiment, the simple structure in which the orifice member 151 is disposed inside the plunger 110 effectively maintains the oil pressure inside the oil pressure chamber 125 at the right level. By maintaining the oil pressure level constant, the drive chain CH is prevented from being tensioned more than necessary by an excessive pressing force.

In this tensioner 100, the orifice member 151 is secured to the plunger 110 by a press fit, i.e., the orifice member 151 undergoes elastic deformation in the circumferential wall part 155 during the press-fit process into the plunger hole 111.

Figure 8:
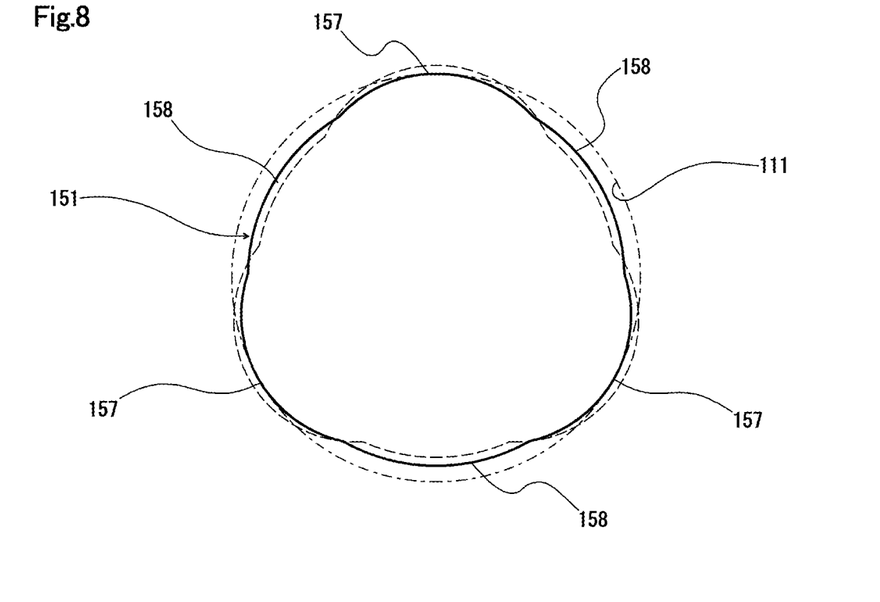
FIG. 8 is a schematic illustration of a state of deformation in the orifice member when it is pressed into the plunger.

When the orifice member 151 is press-fit into the plunger 110, the bulged portions 157 of the orifice member 151 undergo radial inward deformation, reducing in diameter as shown in FIG. 8. At the same time as the bulged portions 157 deform, the cylindrical portions 158 deform radially outwards, increasing in diameter, due to the annular and continuous nature of the circumferential wall part 155. In FIG. 8, the orifice member 151 before the press-fit process is depicted with a broken line.

This design allows for a relatively large amount of interference to be tolerated, and minimizes variations in the force exerted during the press-fit process that result from the varying amount of interference, leading to more consistent force exertion. The cup-shape design of the orifice member 151 with an annular and circumferentially continuous circumferential wall part allows the orifice member 151 itself to exhibit high rigidity, so that the orifice member allows exertion of sufficient force during the press-fit process into the plunger hole 111. Therefore, the orifice member 151 is unlikely to experience stress concentration or undergo significant deformation during the press-fit process.

The occurrence of burrs or breakage of the orifice member 151 can be prevented, and the risk of detachment of the orifice member 151 after press-fit is eliminated. Consequently, the assembly process of the tensioner 100 is made less demanding. Furthermore, the increased tolerance range of the amount of interference not only allows for higher flexibility in assembling and designing processes of the tensioner 100 but also eliminates the need for machining the plunger 110 to a specific inside diameter. This minimizes the demands placed on the machining process and enables cost-effective production.

While one embodiment of the present invention has been described above in detail, the present invention is not limited to the above-described embodiment and may be carried out with various design changes without departing from the scope of the present invention set forth in the claims.

Figure 9:
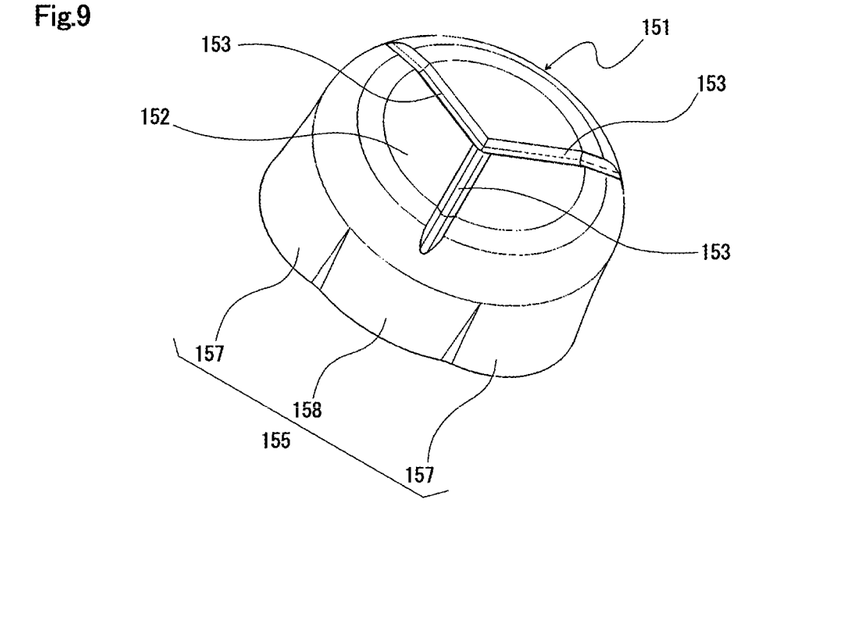
FIG. 9 is a perspective view illustrating another configuration example of the orifice member viewed from the front side.
Figure 10:
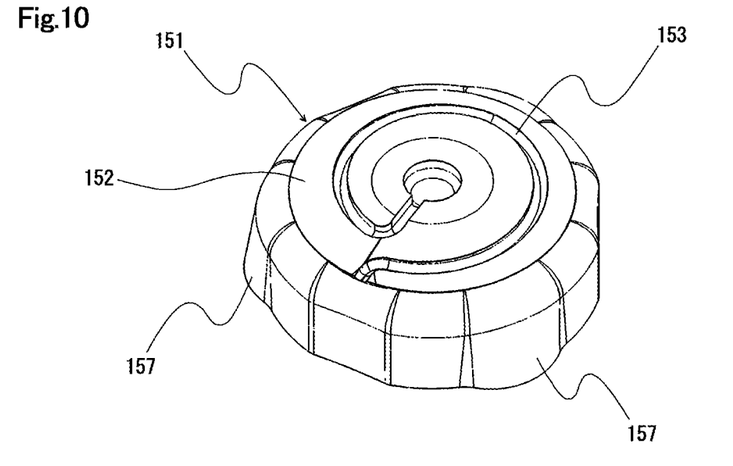
FIG. 10 is a perspective view illustrating yet another configuration example of the orifice member viewed from the front side.

For example, the orifice member 151 used in the embodiment described above is formed with one orifice groove 153 that extends linearly from the center of the end wall part 152 radially outwards. However, in forming an oil passage that includes the orifice groove 153 in it, the shape and other features of the orifice groove 153 are not limited to the configuration of the embodiment described above. For example, as shown in FIG. 9, multiple (here, three) orifice grooves 153 may be provided on the end wall part 152 such as to extend from the center radially outwards, or, a helical orifice groove 153 may be provided on the end wall part 152, starting from the center, as shown in FIG. 10.

Figure 11:
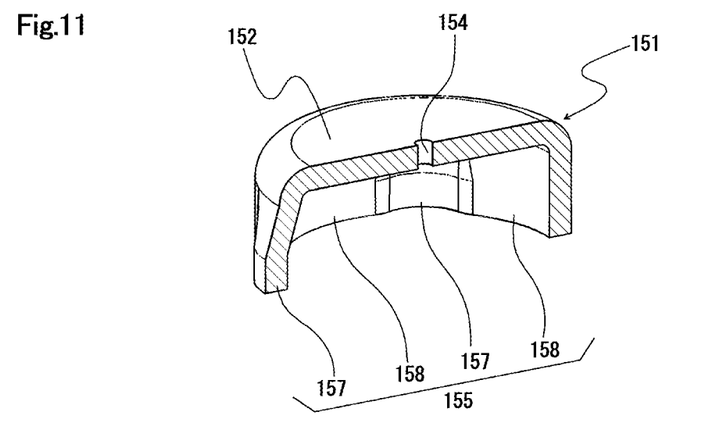
FIG. 11 is a perspective view illustrating a further configuration example of the orifice member, with a cross section of a plane perpendicular to the end wall part.

In the embodiment described above, the oil passage 160 that forms the orifice structure includes the orifice groove 153 provided to the orifice member 151. Instead, the oil passage may be formed by providing a through hole 154 in the orifice member 151, which connects the inner surface of the end wall part 152 facing the oil pressure chamber 125 and the front surface that makes contact with the top end of the plunger hole 111, as shown in FIG. 11.

While the tensioner was described as a component to be incorporated in a timing system of a car engine in the embodiment above, the purpose of use of the tensioner is not limited to this specific application.

While the tensioner was described as a component that applies tension to a drive chain via a tensioner lever in the embodiment above, the plunger can directly guide the drive chain in a slidable manner with a distal end thereof and apply tension to the drive chain.

What is claimed is:

1. A tensioner comprising:
    a plunger having a plunger hole open towards a rear side, and an outlet relief hole opened in a top end on a front side of the plunger hole for communication with an outside space;
    a housing having a plunger bore open towards a front side for accommodating the plunger in a slidable manner;
    a main biasing means housed in an oil pressure chamber that is formed between the plunger and the plunger bore such as to freely expand and contract and biasing the plunger towards the front side; and
    a relief mechanism that releases oil inside the oil pressure chamber out of the plunger when oil pressure inside the oil pressure chamber rises,
    the relief mechanism including an orifice member having an oil passage configured to form an orifice structure for communication between the oil pressure chamber and the outlet relief hole,
    the orifice member being cup-shaped and configured to allow a press-fit into the plunger hole, having a flat circular end wall part and a circumferential wall part extending rearwards from a peripheral edge of the end wall part and continuous in an annular circumferential direction,
    the circumferential wall part including a bulged portion that extends rearwards and is curved radially outwards,
    the bulged portion being designed such that the orifice member has a circumscribed circle with a diameter that is greater than an inside diameter of the plunger as viewed in plan from an axial direction before the orifice member is press-fit into the plunger,
    the orifice member is configured so that the orifice member is deformed so that the distended portions of the peripheral wall shrink in diameter and the portions other than the distended portions expand in diameter when the orifice member is press-fitted into the plunger bore.

2. The tensioner according to claim 1, wherein the bulged portion is formed at least at three circumferentially equally spaced locations.

3. The tensioner according to claim 1, wherein the orifice member includes an orifice groove in a front surface of the end wall part, designed to form the oil passage when the front surface of the end wall part comes into contact with the top end of the plunger hole.

4. The tensioner according to claim 1, wherein the orifice member is made of a metal material.

* * * * *